United States Patent
Shigeta

(10) Patent No.: US 7,492,477 B2
(45) Date of Patent: Feb. 17, 2009

(54) COLOR CONVERSION RELATION DERIVATION METHOD, COLOR CONVERSION RELATION DERIVATION APPARATUS, AND COLOR CONVERSION RELATION DERIVATION PROGRAM STORAGE MEDIUM

(75) Inventor: Norimasa Shigeta, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 670 days.

(21) Appl. No.: 10/791,385

(22) Filed: Mar. 3, 2004

(65) Prior Publication Data
US 2004/0174549 A1   Sep. 9, 2004

(30) Foreign Application Priority Data
Mar. 3, 2003   (JP) .............................. 2003-055124

(51) Int. Cl.
*H04N 1/415*   (2006.01)
(52) U.S. Cl. ...................... 358/1.9; 358/518; 345/604; 703/2
(58) Field of Classification Search ............... 358/1.9, 358/518; 345/604; 703/2
See application file for complete search history.

(56) References Cited

U.S. PATENT DOCUMENTS 5,355,440 A * 10/1994 Sayanagi et al. ............. 358/1.9
6,657,746 B1 * 12/2003 Fuchigami et al. ........... 358/1.9
7,265,870 B2 * 9/2007 Velde et al. .................. 358/1.9

FOREIGN PATENT DOCUMENTS

| JP | 60-105376 A | 6/1985 |
| JP | 61-288662 A | 12/1986 |
| JP | 04-196675 A | 7/1992 |
| JP | 09-130626 A | 5/1997 |
| JP | 2000-188695 A | 7/2000 |
| JP | 2001-045318 A | 2/2001 |

OTHER PUBLICATIONS

Adobe Developer Support, "Device-Independent Color in Postscript Level 2", Mar. 31, 1992, Adobe Systems Inc., Technical Note # 5124, p. 12.*

* cited by examiner

*Primary Examiner*—King Y Poon
*Assistant Examiner*—Jamares Washington
(74) *Attorney, Agent, or Firm*—Sughrue Mion, PLLC

(57) ABSTRACT

A color conversion relation derivation method derives a color conversion relation between a first color space and a second color space. This method comprises an area-forming step that forms a plurality of areas filling the first color space; a partial function derivation step that derives, for each of the areas formed in the area forming step, a partial function representative of a color conversion between coordinates in the area and coordinates of the second color space using a set of an arbitrary sample point provided in the first color space and a point in the second color space, which is associated with the sample point; and a whole function derivation step that combines the partial functions for the respective areas derived by the partial function derivation step to derive a whole function representative of the color conversion relation through the first color space in its entirety.

12 Claims, 13 Drawing Sheets

COLOR CONVERSION RELATION DERIVATION METHOD, COLOR CONVERSION RELATION DERIVATION APPARATUS, AND COLOR CONVERSION RELATION DERIVATION PROGRAM STORAGE MEDIUM

BACKGROUND OF THE INVENTION

1. Field of the Invention

The present invention relates to a color conversion relation derivation method, a color conversion relation derivation apparatus, and a color conversion relation derivation program storage medium, which derive a color conversion relation between a first color space and a second color space.

2. Description of the Related Art

There are known various types of input devices for driving image data upon receipt of an image, for example, a color scanner for deriving image data upon reading of a recorded image, and a digital still camera (DSC) for deriving image data by means of reading through formation of an image of the subject on a solid state imaging device. According to those input devices, image data is represented by data of a range of for example 0 to 255 on each of three colors for example of R (red), G (green) and B (blue). This range represents a range of colors, which can be dealt with as hardware in the input device. However, this range of colors falls short of the whole color spaces capable of being recognized by human. For this reason, even if a color of the original image involves extremely plentiful expression, once conversion into image data by the input device may restrict the image represented by the image data to colors within the color expression area represented by a cube and a rectangular parallelepiped within R, G, B color spaces, which can be dealt with in the input device.

With respect to an output device for outputting an image in accordance with image data, there are known various types of output devices, for example, a photographic printer for recording an image on a photographic paper in such a manner that the photographic paper is exposed with a laser light and the exposed photographic paper is developed, a printer for recording an image on a paper in accordance with an electro-photographic system and an ink jet system, a printing machine for creating a large amount of printed matters through running a rotary press, and an image display unit for displaying an image on a display screen in accordance with image data, for example, a CRT display and a plasma display. Also with respect to those output devices, in a similar fashion to that of the above-mentioned input device, there are color representation areas according to the respective output devices. That is, the output devices can represent various colors in accordance with image data representative of three colors for example, R, G and B, and image data representative of four colors of C (cyan), M (magenta), Y (yellow), and K (black). However, the range of colors, which can be dealt with as hardware in the output device, is restricted to colors within the color representation area (for example, a color representation area represented by numeral values of 0 to 255 on each of three colors of R, G and B) represented by a cube and a rectangular parallelepiped of output device color spaces (for example, RGB color spaces, and CMYK color spaces).

Even if certain image data (for example, image data representative of (R, G, B)=(50, 100, 200)) is concerned, a color of an image, which will be obtained in accordance with the image data, is varied depending on a sort of the output device. In this respect, the same matter is applicable to a relation between the input device and the output device. Even if a certain output device outputs an image in accordance with image data (R, G, B)=(50, 100, 200) obtained through a certain input device, there is no general consistency between a color of an original image of the input device and a color of an output image of the output device. Accordingly, when it is intended that a certain input device is used to read an image so that image data is obtained, and a certain output device is used to reproduce the original image in accordance with the image data, there is a need to convert the image data between the input device and the output device, but not directly transmitting the image data obtained in the input device to the output device. Here, the conversion is performed taking a color of an image into consideration, and the conversion of the image data is referred to as a color conversion. LUT (Look-up table) defining a mutual relationship of image data by the color conversion is referred to as a color profile. In other words, the color profile defines a conversion relationship of the color space coordinate values.

As mentioned above, even if image data, which are the same as one another in numeral value, are concerned, colors to be represented in respective devices are mutually different. Recently, however, it is desired to construct a device independent type of system capable of incorporating therein a plurality of sorts of input devices and a plurality of sorts of output devices, in which the input devices and the output devices are connected with one another. According to such a device independent type of system, to perform a color conversion among the devices, there is adopted a technology of applying a color conversion in which a common color space independent of a device (a space of device independent data), for example, $L^*a^*b^*$ color space, is interposed, and image data on the color space depending on the input device, which is obtained in the input device, is converted into the common color space, and a color conversion of converting image data on the common color space is converted into image data on the color space depending on the output device. According to the device independent type of system, as the above-mentioned color profile, there are created an input profile defining a color conversion from the color space depending on the input device to the common color space, and an output profile defining a color conversion from the color space depending on the output device to the common color space (cf. for example, Japanese Patent Application Laid Open Gazette TokuKaiSho. 60-105376, Japanese Patent Application Laid Open Gazette TokuKaiSho. 61-288662, and Japanese Patent Application Laid Open Gazette TokuKaiHei. 4-196675).

The color conversion using such a color profile is carried out on operational basis on a device having an arithmetic operating function or a computer connected to a device having no arithmetic operating function. Of the color profiles, there is one defining a function representative of a conversion relation of one direction (a forward direction) toward from a certain color space to another color space. With respect to the reverse color conversion, in many cases, this conversion is performed by means of reversely referring to the function representative of the conversion relation of the forward direction. But it is desired that the accuracy of the reverse reference is greater accuracy.

By the way, in order to implement a color conversion with greater accuracy, there is a need to provide a smoothing wherein a color conversion function is provided by a smooth curve. And thus there are proposed a method using a polynomial approximation (for example, cf. Japanese Patent Application Laid Open Gazette TokuKai. 2004-54318), a method using a smoothing spatial filter, and a method using a smoothing spline.

However, according to the method using a polynomial approximation, the approximation is made with one polynomial and thus the color conversion function is easy to be of expression of high order. Accordingly, the use of the color conversion function for color conversion may take a very lot of operating time. Generally, a color reproduction area of a color space (here an input RGB color space) depending on an input device is not coincident with a color reproduction area of a color space (here an output RGB color space) depending on an output device. In case of two stages of color conversion, for example, the input RGB color space—a common color space (here L*a*b* color space—the output RGB color space, if the color conversion function representative of the later stage of color conversion is of expression of high degree, it is difficult to ensure accuracy of the later stage of color conversion on a portion going over the color reproduction area at the output side, of the color reproduction area at the input side. The method using a smoothing spatial filter is a simple method. However, according to this method, filtering up to obtaining a sufficiently smooth curve may enhance a discrepancy from the original value. Accordingly, this method brings about a problem the accuracy of the color conversion is rather lowered. The method using a smoothing spline is of high accuracy, but be easy to take a lot of time for arithmetic operation.

As to accuracy of the color conversion, the larger number of sets of arbitrary sample points provided on one color space and points of another color space associated with the sample points is prepared, the greater accuracy can be expected. But the larger number of sets is prepared, the more lot of time for arithmetic operation it takes.

SUMMARY OF THE INVENTION

In view of the foregoing, it is an object of the present invention to provide a color conversion relation derivation method, a color conversion relation derivation apparatus, and a color conversion relation derivation program storage medium, which are capable of deriving a color conversion relation or a color profile at high speed and with greater accuracy in both the forward direction and the backward direction.

To achieve the above-mentioned object, the present invention provides a color conversion relation derivation method of deriving a color conversion relation between a first color space and a second color space, the color conversion relation derivation method comprising:

an area forming step that forms a plurality of areas filling the first color space;

a partial function derivation step that derives, for each of the areas formed in the area forming step, a partial function representative of a color conversion between coordinates in the area and coordinates of the second color space using a set of an arbitrary sample point provided in the first color space and a point in the second color space, which is associated with the sample point; and a whole function derivation step that combines the partial functions for the respective areas derived by the partial function derivation step to derive a whole function representative of the color conversion relation through the first color space in its entirety.

In the color conversion relation derivation method as mentioned above, it is acceptable that the sample point is a lattice point dividing the first color space as a lattice, the sample point is a point which is set up at random in the first color space, or alternatively the sample point is a sample point used for deriving a forward color conversion relation defining a forward color conversion to convert coordinates of the first color space into coordinates of the second color space.

According to the color conversion relation derivation method of the present invention, the partial function is derived for each area, and thus the partial function is of an expression of low degree with sufficient accuracy. According to the whole function derivation step, the partial functions each having the expression of low degree are combined, and thus the whole functions also have the expression of low degree. As the function representative of the color conversion is of lower degree, it is possible to perform the color conversion at high speed. And thus according to the color conversion relation derivation method, it is possible to derive the color conversion relation capable of performing the color conversion at high speed. Further, according to the present invention, the whole function derivation step joins the partial functions of the areas together smoothly. This feature makes it possible to implement smoothing with greater accuracy. As a result, it is possible to derive the color conversion relation capable of enhancing accuracy of the color conversion through the color space in its entirety. Further, in the event that the reverse color conversion relation, which is derived by the color conversion relation derivation method according to the present invention, is used to perform two stages of color conversion such as the input RGB color space—a L*a*b* color space—the output RGB color space, even if it is concerned with a portion going over the color reproduction area of the output side, of the color reproduction area of the input side, the expression of low degree of the whole function makes it possible to ensure accuracy of the color conversion to some degree.

In the color conversion relation derivation method according to the present invention as mentioned above, it is preferable that the area forming step forms, as the plurality of areas, a plurality of areas overlapping with one another, and the whole function derivation step combines the partial functions in a range that the areas are overlapped with one another.

This feature makes it possible to complement the partial functions of the areas overlapped with one another. Thus, it is possible to implement the smoothing with greater accuracy.

To achieve the above-mentioned object, the present invention provides a color conversion relation derivation apparatus for deriving a color conversion relation between a first color space and a second color space, the color conversion relation derivation apparatus comprising:

an area forming section that forms a plurality of areas filling the first color space;

a partial function derivation section that derives, for each of the areas formed in the area forming section, a partial function representative of a color conversion between coordinates in the area and coordinates of the second color space using a set of an arbitrary sample point provided in the first color space and a point in the second color space, which is associated with the sample point; and a whole function derivation section that combines the partial functions for the respective areas derived by the partial function derivation section to derive a whole function representative of the color conversion relation through the first color space in its entirety.

To achieve the above-mentioned object, the present invention provides a color conversion relation derivation program storage medium storing a color conversion relation derivation program which causes a computer to operate as a color conversion relation derivation apparatus, when the color conversion relation derivation program is incorporated into the computer and is executed, the color conversion relation derivation apparatus comprising:

an area forming section that forms a plurality of areas filling the first color space;

a partial function derivation section that derives, for each of the areas formed in the area forming section, a partial function representative of a color conversion between coordinates in the area and coordinates of the second color space using a set of an arbitrary sample point provided in the first color space and a point in the second color space, which is associated with the sample point; and a whole function derivation section that combines the partial functions for the respective areas derived by the partial function derivation section to derive a whole function representative of the color conversion relation through the first color space in its entirety.

With respect to the color conversion relation derivation apparatus of the present invention and the color conversion relation derivation program storage medium of the present invention, only the basic aspects are disclosed here. It is noted that the color conversion relation derivation apparatus and the color conversion relation derivation program storage medium of the present invention include not only the basic aspects, but also various aspects corresponding to the above-mentioned aspects of the color conversion relation derivation apparatus.

While the similar names are applied to the structural elements in the color conversion relation derivation apparatus and the color conversion relation derivation program storage medium, those structural elements mean the hardware and the software in the color conversion relation derivation apparatus, and mean only the software in the color conversion relation derivation program storage medium.

With respect to the structural elements such as the area forming section constituting the color conversion relation derivation program related to the present invention, it is acceptable that function of one structural element is implemented by one program part, function of one structural element is implemented by a plurality of program parts, or alternatively functions of a plurality structural elements are implemented by one program part. Further, it is acceptable that those structural elements are executed by oneself or by instruction to another program or program parts incorporated into a computer.

DETAILED DESCRIPTION OF PREFERRED EMBODIMENTS

Embodiments of the present invention will be described with reference to the accompanying drawings.

Figure 1:
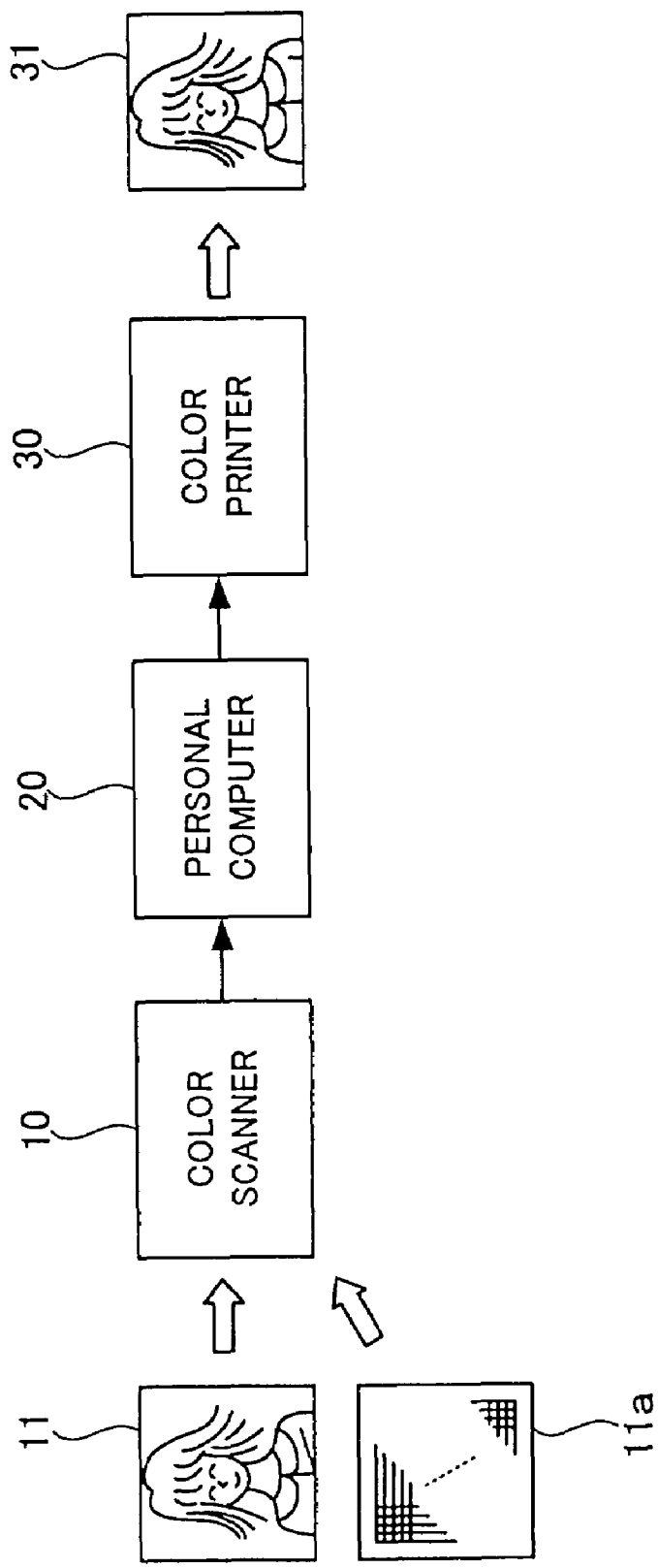
FIG. 1 is a construction view of an image input-color conversion-image output system to which an embodiment of the present invention is applied.

FIG. 1 is a construction view of an image input-color conversion-image output system to which an embodiment of the present invention is applied.

A color scanner 10 reads an original image 11 recorded on a color reversal film and creates image data for RGB three colors. The image data for RGB three colors is fed to a personal computer 20. In the personal computer 20, the image data, which is obtained by the color scanner 10, is converted into image data for RGB three colors for an image output suitable for a color printer 30 (which will be described later). The image data for the image output thus obtained through the conversion is fed to the color printer 30. The color printer 30 performs a printing output in accordance with the entered image data to form a printed image 31.

The personal computer 20 serves also as a color conversion relation derivation apparatus. The personal computer 20 derives a color conversion relation or a color profile beforehand. When the image data obtained by the color scanner 10 is converted into the image data for the color printer 30, the derived color conversion relation or the color profile is referred to. There will be described later the color conversion relation and a method of derivation of the color conversion relation. To derive the color conversion relation, the color scanner 10 reads color chart 11a wherein a large number of color patches, which is recorded on a color reversal film, is arranged.

According to the system shown in FIG. 1, there is shown the color printer 30 by way of example of an output device for outputting an image based on image data. It is acceptable, however, that the color printer 30 is an electrophotographic system of color printer, an ink jet system of color printer, or a printer having a system in which a photographic paper is exposed with modulated laser beam and the photographic paper is developed. In effect, any printing system is acceptable. Further, as the output device, it is not restricted to a printer, and any one is acceptable, as the output device, which is concerned with for example, a printing machine or an image display unit such as a CRT display unit for displaying an image on a display screen and a plasma display unit.

An aspect of the embodiment of the present invention in the system shown in FIG. 1 resides in color conversion relation derivation processing which is executed when the color conversion relation is derived in the personal computer 20. Hereinafter, there will be explained the personal computer 20.

Figure 2:
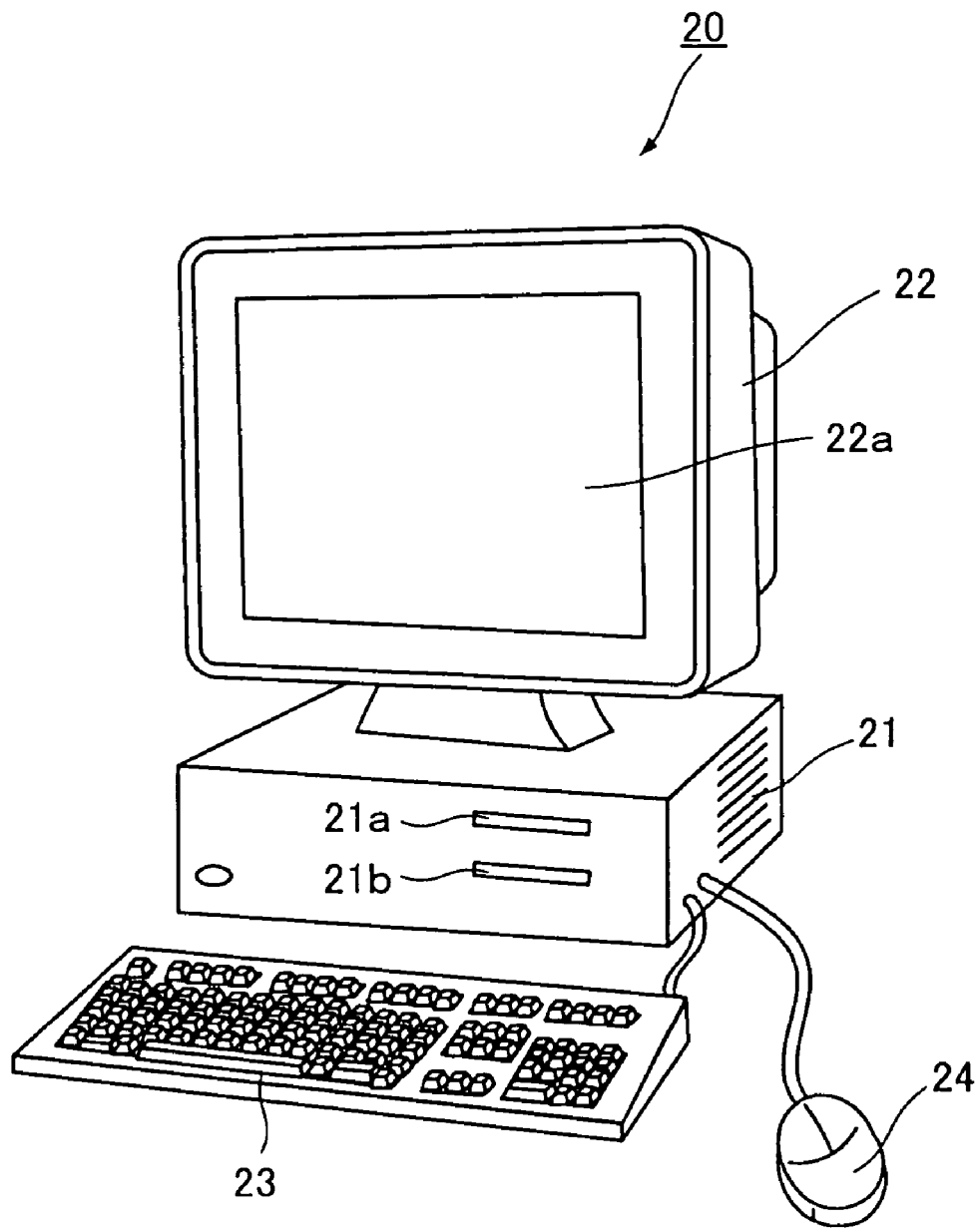
FIG. 2 is a perspective view of a personal computer shown in FIG. 1.
Figure 3:
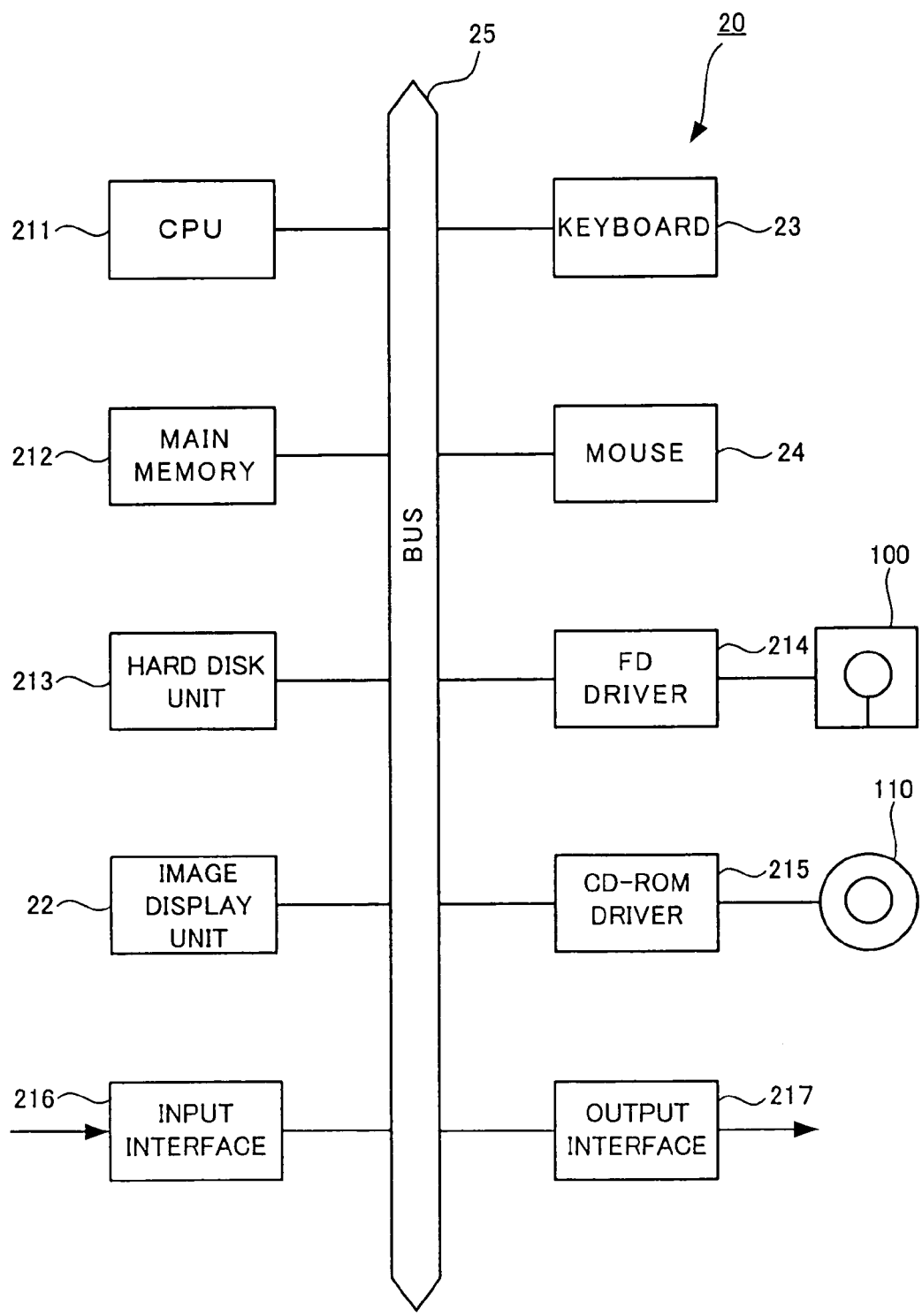
FIG. 3 is a hardware structural view of the personal computer 20.

FIG. 2 is a perspective view of a personal computer shown in FIG. 1. FIG. 3 is a hardware structural view of the personal computer 20.

The personal computer 20 comprises, on an external appearance, a main frame unit 21, an image display unit 22 for displaying an image on a display screen 22a in accordance with an instruction from the main frame unit 21, a keyboard 23 for inputting various sorts of information to the main frame unit 21 in accordance with a key operation, and a mouse 24 for inputting an instruction according to, for example, an icon and the like, through designation of an optional position on the display screen 22a, the icon and the like being displayed on the position on the display screen 22a. The main frame unit 21 has a flexible disk mounting slot 21a for mounting a flexible disk, and a CD-ROM mounting slot 21b for mounting a CD-ROM.

The main frame unit 21 comprises, as shown in FIG. 3, a CPU 211 for executing a various types of program, a main memory 212 in which a program stored in a hard disk unit 213 is read out and developed for execution by the CPU 211, the hard disk unit 213 for saving various types of programs and data, a flexible disk drive 214 for accessing a flexible disk 100 mounted thereon, a CD-ROM drive 215 for accessing a CD-ROM 110 mounted thereon, an input interface 216 connected to the color scanner 10 of FIG. 1 to receive image data from the color scanner 10, and output interface 217 connected to the color printers 30 in FIG. 1 to transmit image data to the printer 30. These various types of elements are connected via a bus 25 to the image display unit 22, the keyboard 23 and the mouse 24.

The CD-ROM 110 stores therein a color conversion relation derivation program for causing the personal computer 20 to operate as a color conversion relation derivation apparatus of the present invention. The CD-ROM 110 is mounted on the CD-ROM drive 215 so that the color conversion relation derivation program, which is stored in the CD-ROM 110, is up-loaded on the personal computer 20 and is stored in the hard disk unit 213.

Next, there will be described a derivation method of a color conversion relation in the personal computer 20. Here, first, there will be described a technology of the conventional color conversion.

Figure 4:
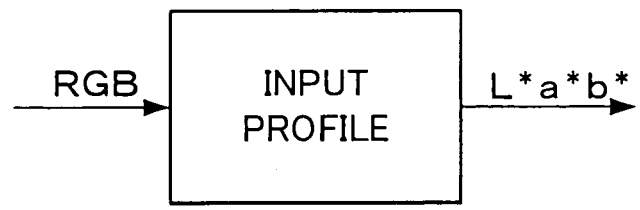
FIG. 4 is a conceptual view of an input profile.

FIG. 4 is a conceptual view of an input profile.

When the input profile is available from a maker of the color scanner 10, there is no need to create the input profile. Here, there will be briefly explained an outline of a creating method of the input profile.

There is prepared a color patch image 11a consisting of a large number of color patches instead of an original image 11 shown in FIG. 1. The color scanner 10 reads the color patch image 11a to generate color data on an input RGB space (an example of the first color space referred to in the present invention) for each of the color patches. And a calorimeter is used to measure the color patch image so as to generate color data representative of coordinate points on a L*a*b* space, which is an example of the second color space referred to in the present invention, for each of the color patches.

In this manner, it is possible to obtain an input profile (an example of a color conversion relation) defining an association between the coordinate points on the input RGB space and the coordinate points on the L*a*b* space. The input profile is varied in accordance with a sort of the color scanner 10 and a sort of an input device, and depends on the input device.

Figure 5:
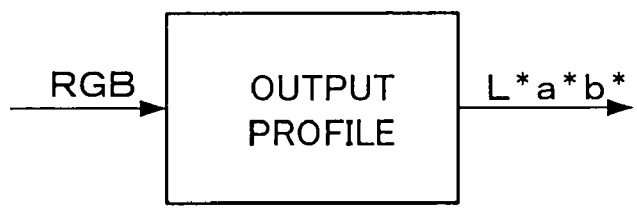
FIG. 5 is a conceptual view of an output profile.

FIG. 5 is a conceptual view of an output profile.

It happens that the output profile associated with a color printer is provided from a maker of the color printer. And thus in the event that the output profile associated with a color printer of interest is available, there is no need to create the output profile. Here, however, there will be explained an outline of a creating method of the output profile.

The personal computer 20 shown in FIG. 1 is used to generate, as image data for RGB three colors, image data in which values for R, G and B are sequentially varied. The color printer 30 prints out a color patch image in accordance with the thus generated image data. While the printed image 31 shown in FIG. 1 is not an image representative of a color patch image, a calorimeter measures color patches constituting the color patch image, assuming that the color printer 30 prints out the color patch image instead of the printed image 31. This feature makes it possible to construct an output profile (an example of the color conversion relation) representative of the association between coordinate values on an output RGB space (an example of another of the first color space referred to in the present invention) and coordinate values on a L*a*b* color space (an example of the second color space referred to in the present invention).

This output profile is varied in accordance with output devices, that is, depends on the output devices.

Figure 6:
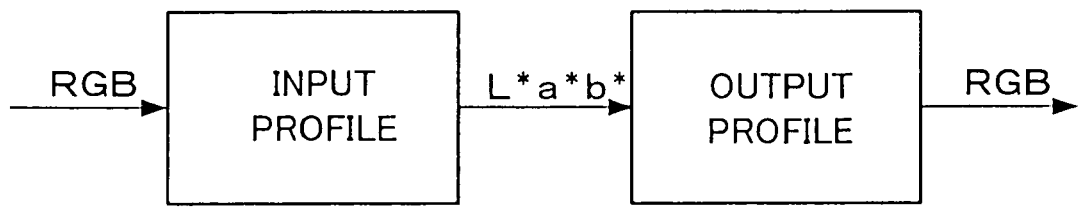
FIG. 6 is a conceptual view useful for understanding a color conversion algorithm consisting of an input profile and an output profile.

FIG. 6 is a conceptual view useful for understanding a color conversion algorithm consisting of an input profile and an output profile.

The input profile and the output profile, which are explained referring to FIG. 4 and FIG. 5, are stored in the personal computer 20 shown in FIG. 1. As shown in FIG. 6, image data for RGB generated by the color scanner 10 is once converted into image data on a L*a*b* color space by the input profile, and the image data on a L*a*b* color space is converted into image data for RGB by the output profile. The thus converted image data for RGB is transferred to a color printer. This feature makes it possible that the color printer 30 outputs the printed image 31 in which a color expression of the original image 11 is reproduced.

Generally, however, a color conversion is not performed using the input profile and the output profile for each image data, but the color conversion is performed beforehand on image data associated with lattice points dividing the input RGB space as a lattice and there is created a combination profile representative of the association between the coordinate values on the input RGB space and the coordinate values on the output RGB space. And the combination profile is stored in the personal computer 20 shown in FIG. 1 to perform a conversion of image data.

By the way, when the color conversion and creation of the combination profile are actually carried out using the personal computer 20 shown in FIG. 1 and the like, there is a need to convert the image data on the L*a*b* color space into the image data for RGB by the output profile. That is, assuming that a conversion of coordinates of the RGB space into coordinates of the L*a*b* color space (the RGB space—the L*a*b* color space), as shown in FIG. 5, is referred to as a forward color conversion, here, a reverse color conversion (the L*a*b* color space—the RGB space) has to be carried out. According to the present embodiment, the forward color conversion relation derives the reverse color conversion relation using the output profile explained in conjunction with FIG. 5. Before explaining the derivation of the reverse color conversion relation, there will be explained a color reproduction area on the output RGB space and a color reproduction area on the L*a*b* color space.

Figure 7:
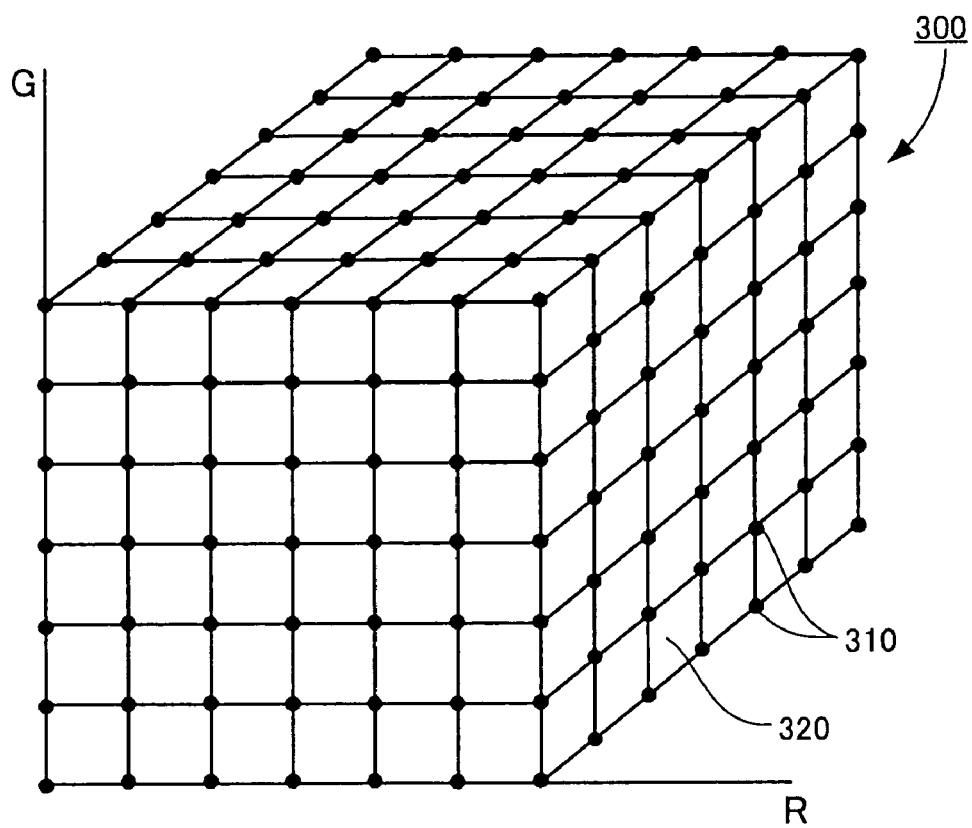
FIG. 7 is a view showing a color reproduction area on an output RGB color space.

FIG. 7 is a view showing a color reproduction area on an output RGB color space.

A color reproduction area 300 on the output RGB color space forms a cube-configuration, for example, from 0 to 255 on the RGB three colors. Image data representative of color patch images, wherein the output profile is created, correspond to lattice points 310 dividing the color reproduction area 300 into regular lattice configurations, respectively.

The coordinate values on the L*a*b* color space associated with the lattice points 310 are established as calorimetric values wherein the color patch image is measured by the colorimeter as mentioned above. The coordinate values on the L*a*b* color space associated with the coordinate points within a lattice space 320 encircled by the lattice points 310 are computed by an interpolation computation in accordance with the calorimetric values associated with the lattice points 310 encircling the lattice space 320.

In this manner, it is easy to compute the coordinate values on the associated L*a*b* color space from the coordinate values on the RGB color space. To the contrary, in many cases, it is troublesome to compute the coordinate values on the RGB color space associated with the coordinate values on the established L*a*b* color space.

Figure 8:
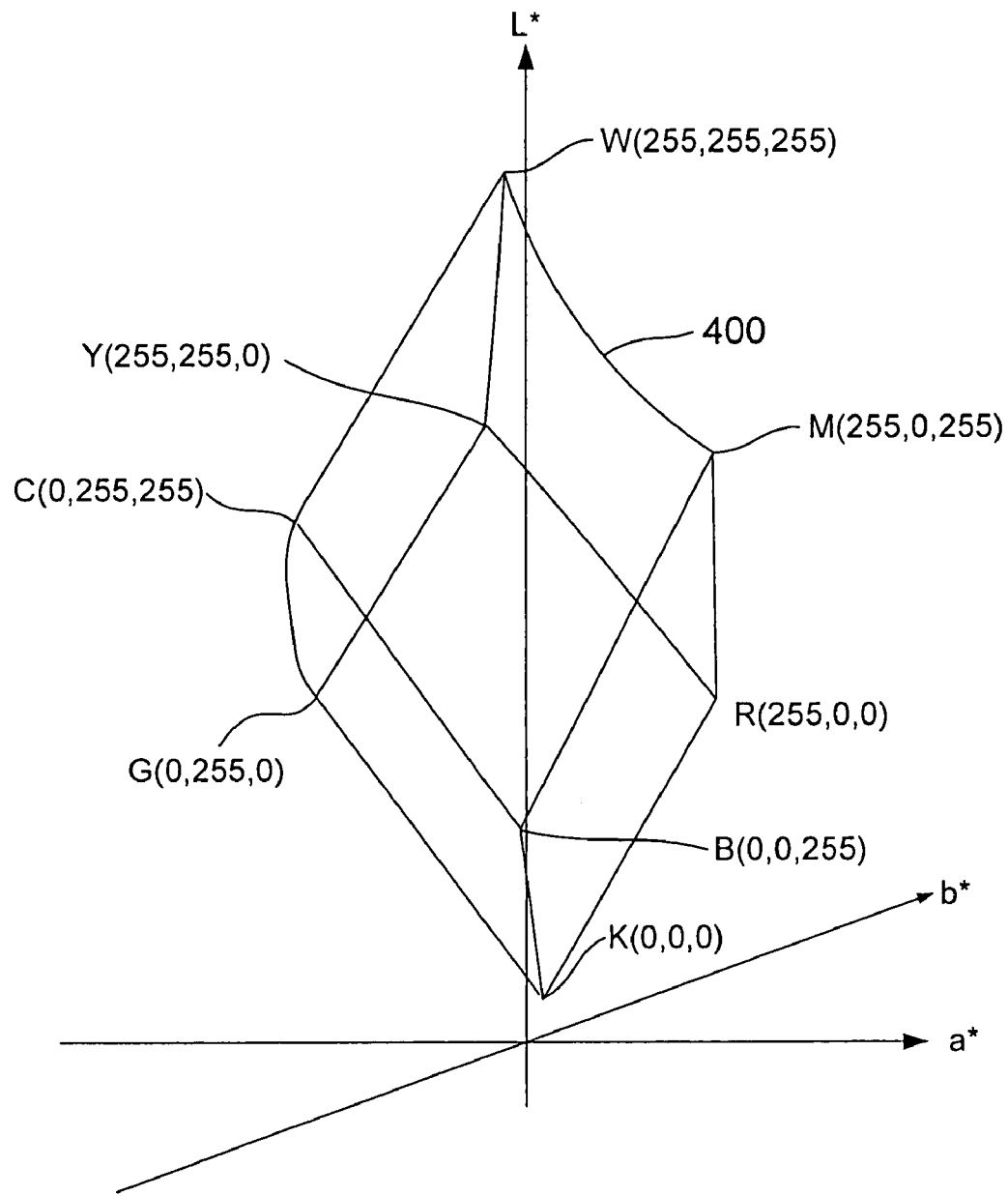
FIG. 8 is a view showing a color reproduction area on an L*a*b* color space.

FIG. 8 is a view showing a color reproduction area on an L*a*b* color space.

A color reproduction area 400, wherein a cube-shaped color reproduction area on the RGB color space is transferred to the L*a*b* color space, has the approximate hexahedron configuration. FIG. 8 shows coordinate values on the associated RGB space on eight vertexes R, G, B, C, M, Y and W of the color reproduction area 400. From FIG. 8 it looks like that the approximate hexahedron configuration of the color reproduction area 400 consists of smooth edge lines and associates with the color reproduction area on the RGB space with high regularity. However, actually, the approximate hexahedron configuration of the color reproduction area 400 is high in nonlinearity and has the irregular association with the color reproduction area on the RGB space.

Hereinafter, there will be explained a color conversion relation derivation method of deriving a reverse color conversion relation between the output RGB space having the color reproduction area shown in FIG. 7 and the L*a*b* color space having the color reproduction area shown in FIG. 8.

Figure 9:
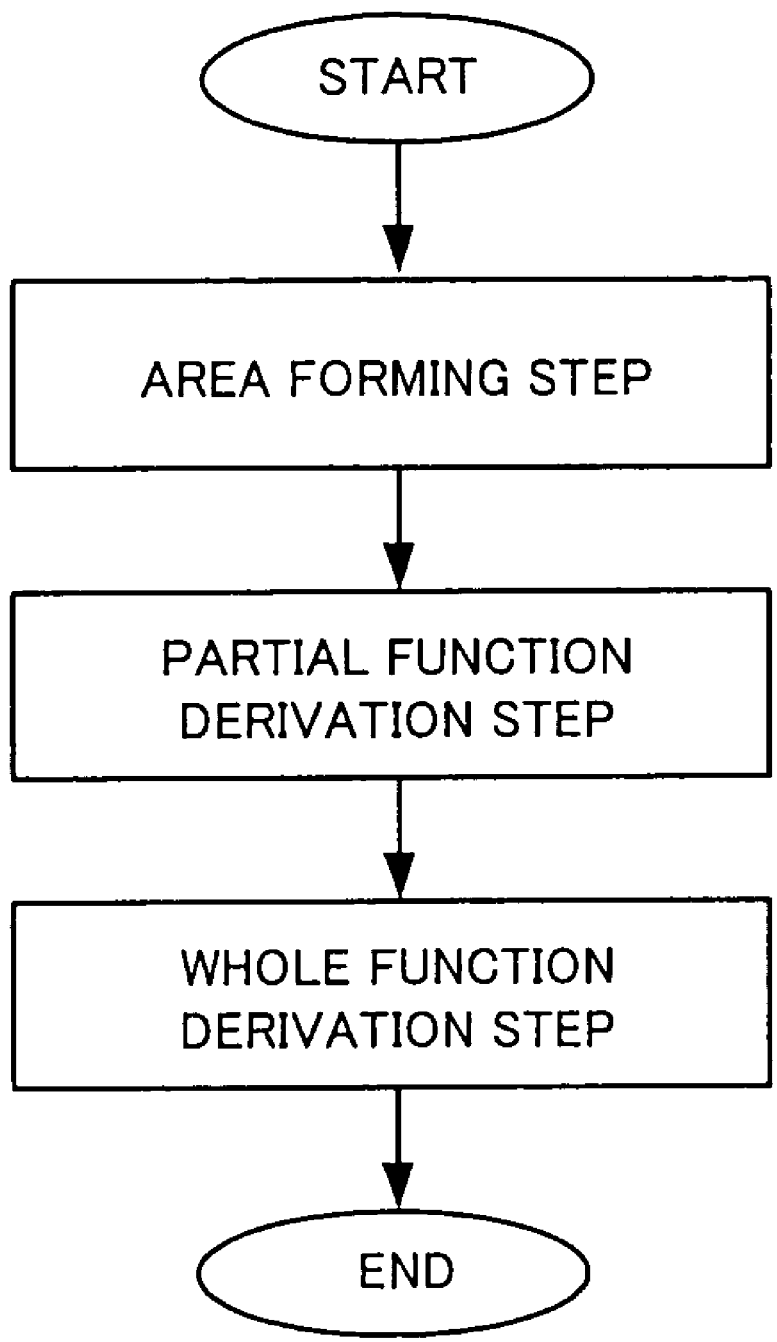
FIG. 9 is a flowchart useful for understanding a color conversion relation derivation method according to an embodiment of the present invention.

FIG. 9 is a flowchart useful for understanding a color conversion relation derivation method according to an embodiment of the present invention.

The color conversion relation derivation method shown in FIG. 9 comprises an area forming step (step S91), a partial function derivation step (step S92), and a whole function derivation step (step S93).

The area forming step (step S91) forms a plurality of areas mutually overlapped, with which the color reproduction area 300 on the output RGB space shown in FIG. 7 is filled. The area forming step (step S91) corresponds to an example of the area forming step in the color conversion relation derivation method of the present invention.

The partial function derivation step (step S92) derives, for each of the areas formed in the area forming step (step S91), a partial function representative of the reverse color conversion between coordinate values in the area and coordinate values of the L*a*b* color space using a set of an arbitrary sample point provided in the output RGB space shown in FIG. 7 and a point in the L*a*b* color space shown in FIG. 8, which is associated with the sample point. The partial function derivation step (step S92) corresponds to an example of the partial function derivation step in the color conversion relation derivation method of the present invention.

The whole function derivation step (step S93) combines the partial functions for the respective areas derived by the execution of the partial function derivation step (step S92) to derive the whole function. The whole function derivation step (step S93) corresponds to an example of the whole function derivation step in the color conversion relation derivation method of the present invention. The whole function derived in the whole function derivation step (step S93) is the reverse color conversion relation between the output RGB space and the color reproduction area on the L*a*b* color space.

Details of those steps will be described later.

Figure 10:
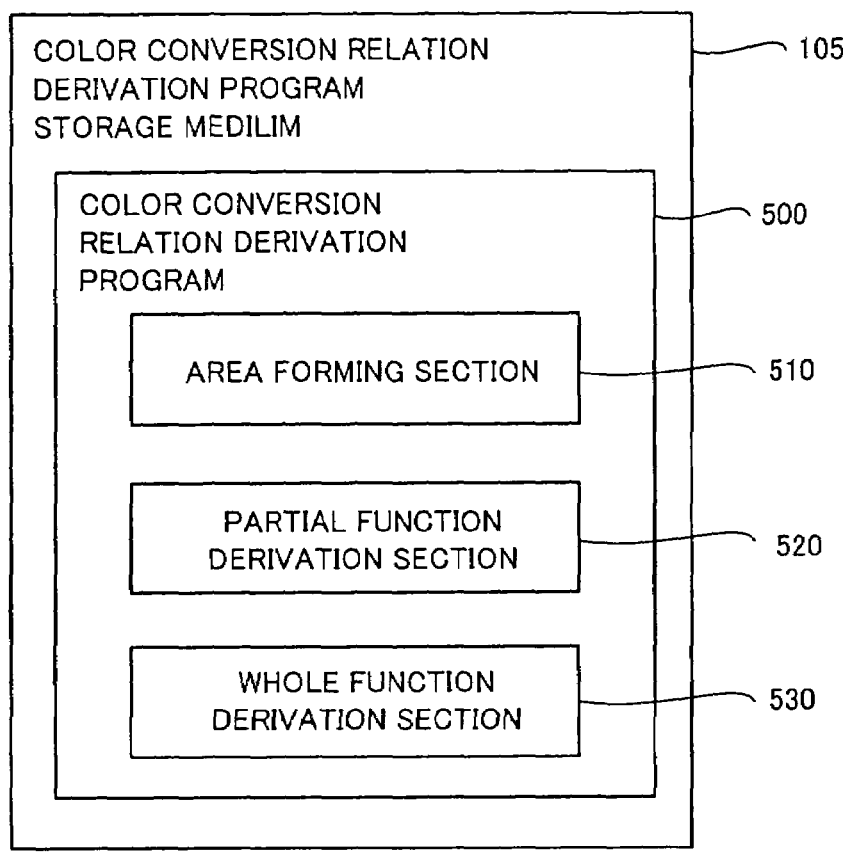
FIG. 10 is a view useful for understanding a color conversion relation derivation program stored in a color conversion relation derivation program storage medium according to an embodiment of the present invention.

FIG. 10 is a view useful for understanding a color conversion relation derivation program stored in a color conversion relation derivation program storage medium according to an embodiment of the present invention. A color conversion relation derivation program 500 is stored in storage medium 105.

Any one is acceptable, as the storage medium 105 shown in FIG. 10, which stores the color conversion relation derivation program 500. For example, when a CD-ROM stores therein the color conversion relation derivation program 500, the storage medium is the CD-ROM; when the color conversion relation derivation program 500 is loaded and stored in a hard disk unit, the storage medium is the hard disk unit; and when the color conversion relation derivation program 500 is down loaded on a flexible disk, the storage medium is the flexible disk.

The color conversion relation derivation program 500 is executed when the personal computer 20 shown in FIG. 1 is operated as a color conversion relation derivation apparatus for deriving the color conversion relation, and causes the personal computer 20 to operate as the color conversion relation derivation apparatus. The color conversion relation derivation program 500 comprises an area forming section 510, a partial function derivation section 520, and a whole function derivation section 530.

The area forming section 510, the partial function derivation section 520, and the whole function derivation section 530 serve to execute the area forming step (step S91), the partial function derivation step (step S92), and the whole function derivation step (step S93), respectively. The area forming section 510, the partial function derivation section 520, and the whole function derivation section 530 correspond to the examples of the area forming section, the partial function derivation section, and the whole function derivation section, respectively, in the color conversion relation derivation program 500 related to the present invention.

There will be described later functions of the respective elements of the color conversion relation derivation program 500.

Figure 11:
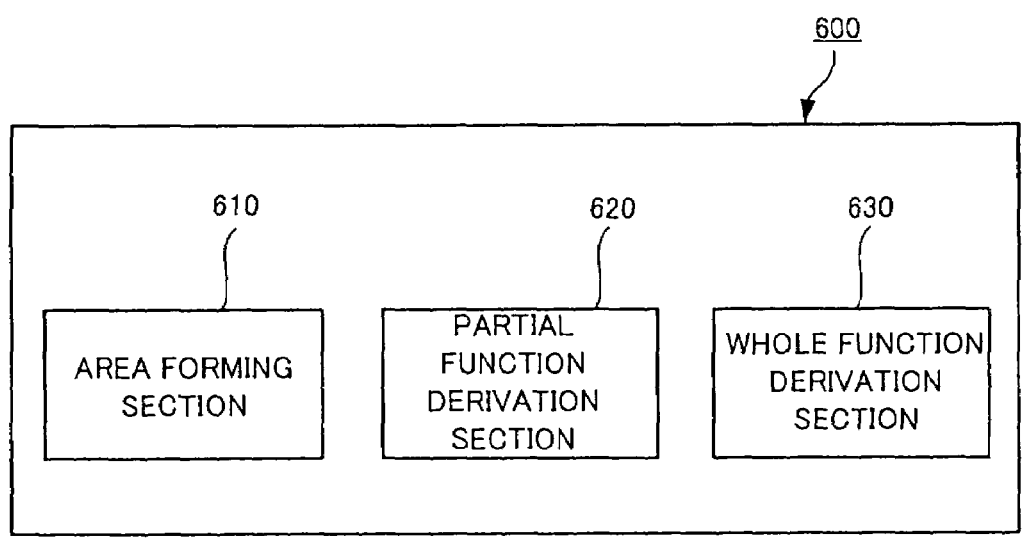
FIG. 11 is a functional block diagram of a color conversion relation derivation apparatus according to an embodiment of the present invention.

FIG. 11 is a functional block diagram of a color conversion relation derivation apparatus according to an embodiment of the present invention.

A color conversion relation derivation apparatus 600 is constructed when the color conversion relation derivation program 500 shown in FIG. 10 is installed in the personal computer 20 shown in FIG. 1 and executed.

The color conversion relation derivation apparatus 600 comprises an area forming section 610, a partial function derivation section 620, and a whole function derivation section 630. The area forming section 610, the partial function derivation section 620, and the whole function derivation section 630 correspond to the area forming section 510, the partial function derivation section 520, and the whole function derivation section 530, respectively, which constitute the color conversion relation derivation program 500 shown in FIG. 10. While the respective elements of the color conversion relation derivation apparatus 600 shown in FIG. 11 is constituted of a combination of hardware of the personal computer 20 shown in FIG. 1 and an OS and an application program, the respective elements of the color conversion relation derivation program shown in FIG. 10 is constituted of only the application program.

The area forming section 610, the partial function derivation section 620, and the whole function derivation section 630 correspond to the examples of the area forming section, the partial function derivation section, and the whole function derivation section 630, in the color conversion relation derivation apparatus of the present invention, respectively.

Hereinafter, an explanation of the respective elements of the color conversion relation derivation apparatus 600 shown in FIG. 11 will explain the respective steps of the flowchart shown in FIG. 9 and the respective elements of the color conversion relation derivation program 500 shown in FIG. 10 as well. The color space is of three-dimensional. However, for the purpose of simplification of the explanation, it may happen that the explanation is made on a two-dimensional basis.

First, there will be explained processing to be executed in the area forming section 610 shown in FIG. 11.

Figure 12:
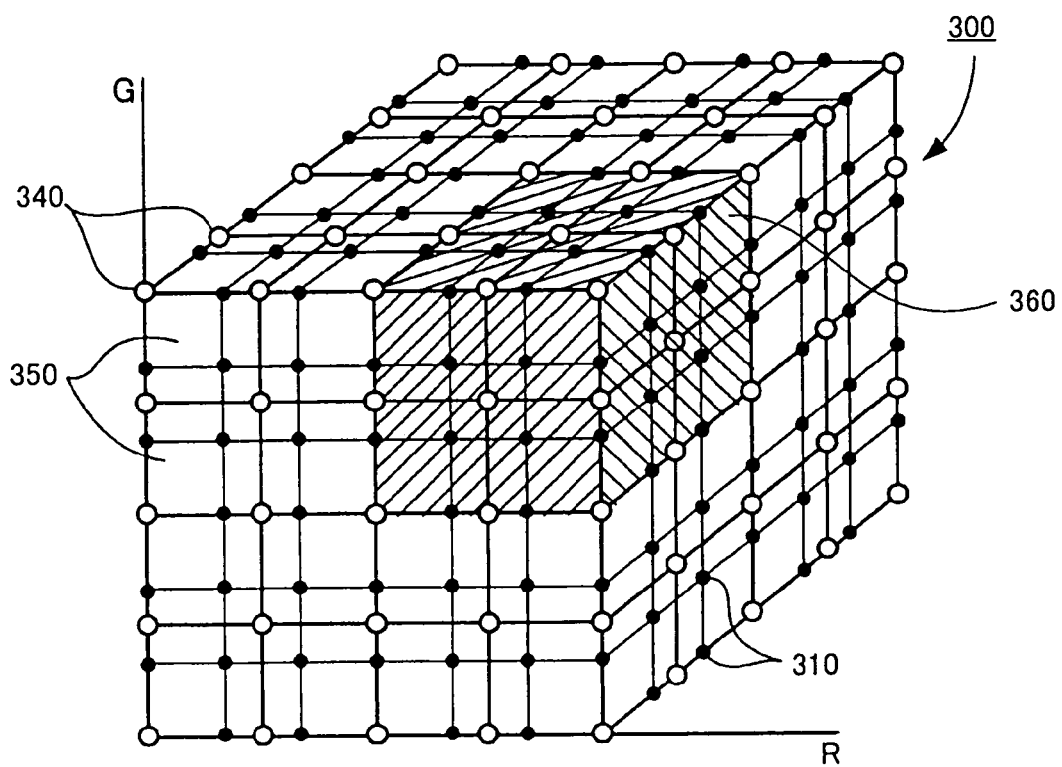
FIG. 12 is a view showing an example in which the respective sides of the color reproduction area are divided into equal four parts, and the divided parts are each divided into 64 pieces of area.

FIG. 12 is a view showing an example in which the respective sides of the color reproduction area are divided into equal four parts, and the divided parts are each divided into 64 pieces of area.

First, the area forming section 610 divides the color reproduction area 300 by divisional points 340 roughly rather than division by the lattice points 310 shown in FIG. 7. The spaces divided by the divisional points 340 are referred to as divisional spaces 350. Next, the area forming section 610 forms a plurality of areas mutually overlapped, with which the color reproduction area 300 is filled. The respective area is constructed in unit of the divisional space 350. FIG. 12 shows one area 360 by applying hatching. The hatched area 360 consists of total eight pieces of divisional spaces 350 adjacent to one another in RGB directions.

Figure 13:
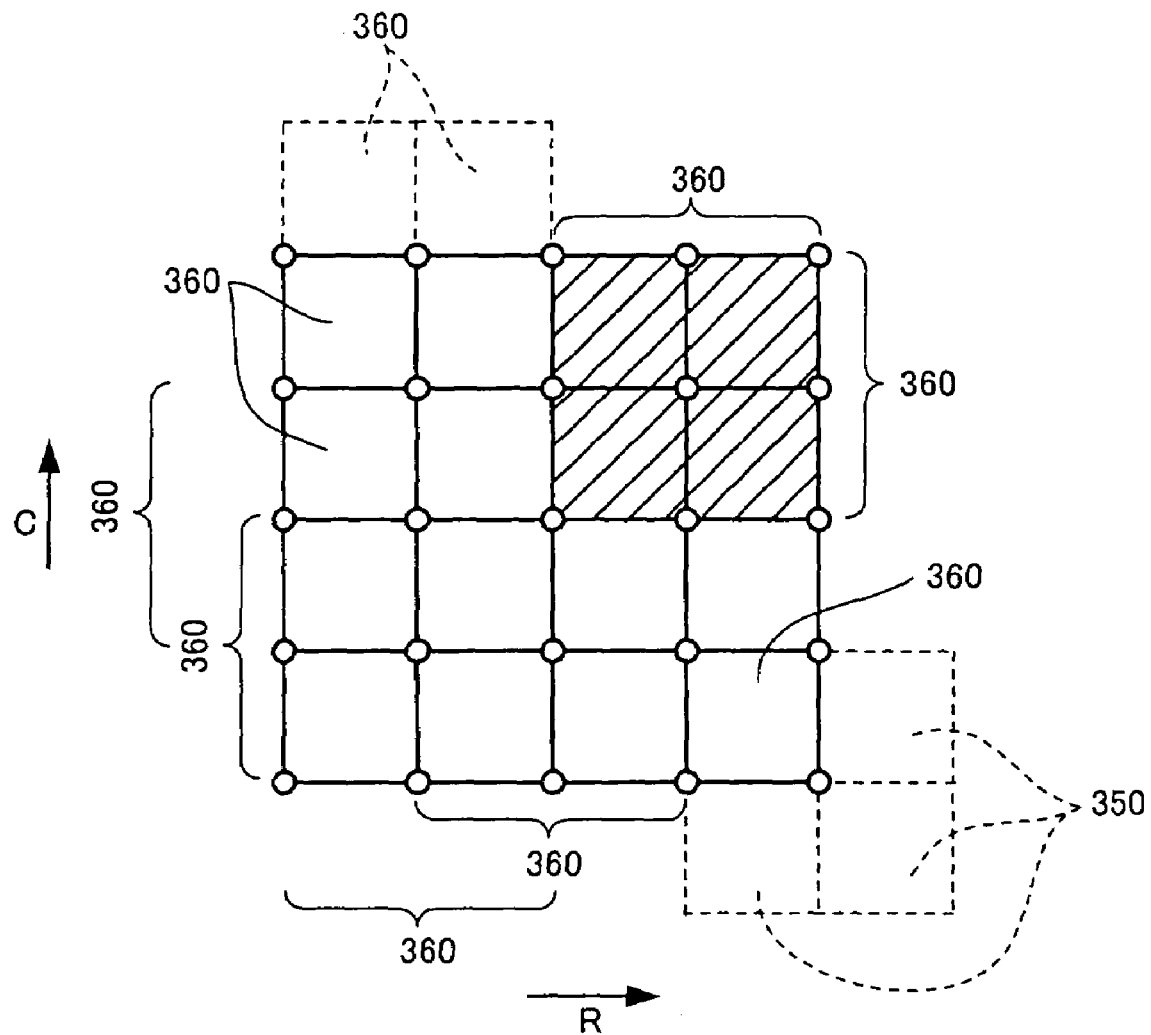
FIG. 13 is a view showing an RG plane of the RGB space shown in FIG. 12.

FIG. 13 is a view showing an RG plane of the RGB space shown in FIG. 12.

In FIG. 13, the hatched area 360 in FIG. 12 is located at the upper right. The area forming section 610 forms ones as portions of the edge of the color reproduction area 300, in which as shown at the lower right, portions corresponding to seven pieces of divisional spaces (three pieces of divisional spaces 350 shown with dotted lines since FIG. 13 depict the spaces on a two-dimensional basis) are located out of the color reproduction area 300, and as the area it consists of one divisional space 350, and ones in which as shown at the upper left, portions corresponding to six pieces of divisional spaces (two pieces of divisional spaces 350 shown with dotted lines since FIG. 13 depict the spaces on a two-dimensional basis) are located out of the color reproduction area 300, and as the area it consists of two divisional spaces 350.

Further, in FIG. 13, three areas 360 are arranged in the R direction in such a manner that adjacent areas 360 are overlapped with one another half by half, and also in the G direction in the same manner. As the overlapping areas 360, which are formed by the area forming section 610, there are three types a first one of which overlaps in one divisional space 350 constituting the adjacent areas 360, a second one of which overlaps in two divisional spaces 350 constituting the adjacent areas 360, and a third one of which overlaps in three divisional spaces 350 constituting the adjacent areas 360. According to the present invention, as to the type of the overlapping areas, it is optional.

Next, there will be explained processing to be executed by the partial function derivation section 620 shown in FIG. 11.

Figure 14:
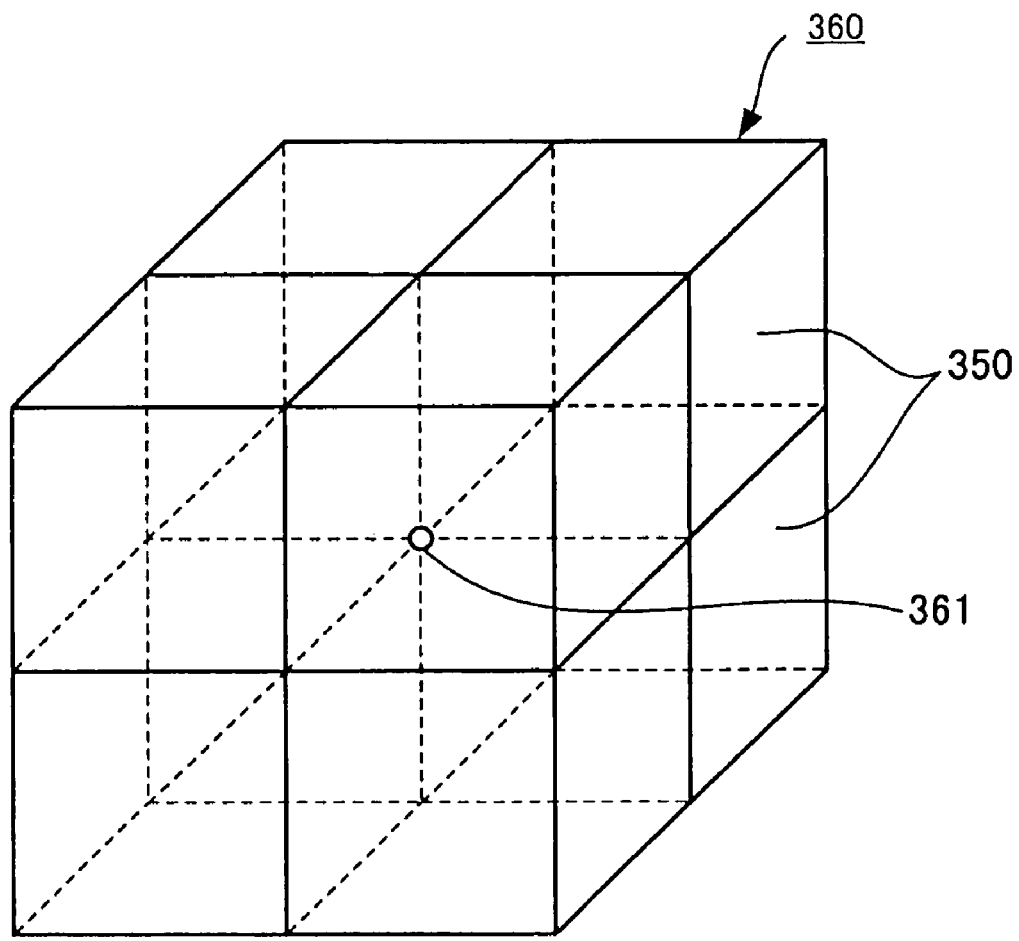
FIG. 14 is a view showing one block area shown in FIG. 13.

FIG. 14 is a view showing one block area shown in FIG. 13.

Each of the areas 360 has a central point 361 in which eight pieces of divisional spaces 350 constituting the associated area 360 are overlapped with one another at one point. The partial function derivation section 620 first extracts the central point 361 in each of the areas 360. All of the divisional points 340 shown in FIG. 12 are the central points 361 in any of the areas. While FIG. 14 omits the illustration of the lattice points 310 shown in FIG. 12, for example, the hatched area 360 shown in FIG. 12 includes a plurality of lattice points 310 as shown in FIG. 12. This is not restricted to the hatched area 360. All of the areas 360 may include a plurality of lattice points 310 as shown in FIG. 12. The partial function derivation section 620 extracts the lattice points 310 included in each of the areas 360. Each of the lattice points 310 corresponds to an example of the sample point referred to in the present invention. The sample point referred to in the present invention is not restricted to the lattice points 310 as shown in FIG. 12, and it is acceptable that the sample point is a point which is set up at random in the color reproduction area 300 shown in FIG. 12. The points in the L*a*b* color space shown in FIG. 8 associated with the lattice points 310 shown in FIG. 12 are given in form of calorimetric values when the color patch is measured by the calorimeter, as mentioned above. Next, the partial function derivation section 620 uses a set of lattice points 310 shown in FIG. 12 and the points in the L*a*b* color space shown in FIG. 8 associated with the lattice points 310 to determine, for each area 360, by polynomial approximation, a relation between coordinates on the output RGB color space shown in FIG. 7 (FIG. 12) of the lattice points included in the areas and coordinates on the L*a*b* color space shown in FIG. 8 associated with the coordinates on the output RGB color space. As a result, there are determined three quadratic expressions as set forth below. Those expressions are the partial function referred to in the present invention.

$$L=a00*PR+a01*GG+a02*BB+a03*RG+a04*GB+ a05*BR+a06*R+a07*G+a08*B+a09*1 \quad (1)$$

$$a=a10*PR+a11*GG+a12*BB+a13*RG+a14*GB+ a15*BR+a16*R+a17*G+a18*B+a19*1 \quad (2)$$

$$b=a20*PR+a21*GG+a22*BB+a23*RG+a24*GB+ a25*BR+a26*R+a27*G+a28*B+a29*1 \quad (3)$$

Coefficient (aij) in terms of the expression (1) to the expression (3) is computed in accordance with a weighted least squares method. The term "weighted" means that the lattice points 310 extracted for each area 360 are weighted in accordance with distances from the associated central points 361, respectively.

Figure 15:
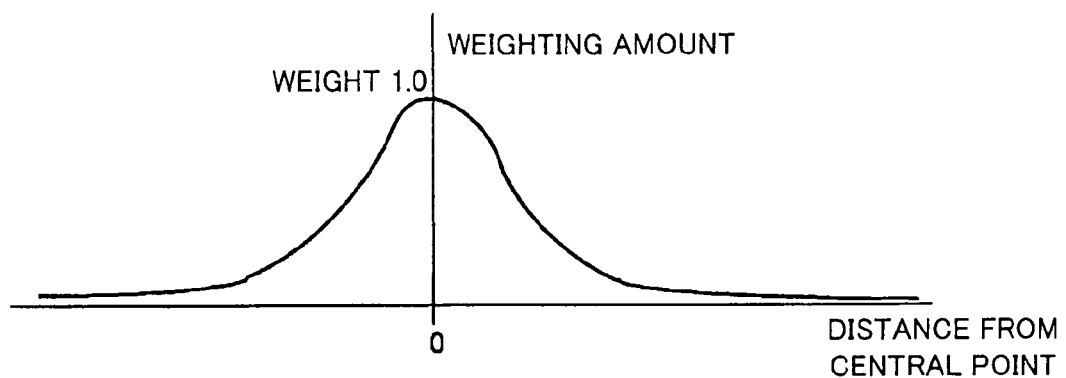
FIG. 15 is an explanatory view useful for understanding weighting by a partial function derivation section.

FIG. 15 is an explanatory view useful for understanding weighting by a partial function derivation section.

A horizontal axis of a graph shown in FIG. 15 denotes a distance from the central point 361 and a position of "0" is the position of the central point 361. A vertical axis of the graph denotes a weighting amount. The partial function derivation section 620 performs weighting in accordance with the graph shown in FIG. 15. More in detail, in the event that the lattice points 310 overlap with one another at the central point 361, the weighting amount offers the maximum value "1.0", and as the lattice points 310 go away from the central point 361, the weighting amount is little, so that the weighting amount is close to "0" at the position of the central point 361 of the adjacent area 360. In this manner, the partial function derivation section 620 performs for each area 360 weighting on the lattice points 310 included in the associated area 360 and computes the coefficient (aij) in terms of the expression (1) to the expression (3) in accordance with a method of least squares method. The thus obtained coefficient (aij) is stored in association with the central point 361. With respect to an area consisting of one divisional space 350, it happens that the number of lattice points 310 included in the area is too short to solve the method of least squares. In this case, it is effective that the area range is extended to a divisional space 350 adjacent to the one divisional space 350 to increase the number of lattice points 310 included in the areas so as to solve the method of least squares. Accuracy in the vicinity of gray is significant, and thus it is preferable that not only weighting according to a distance from the respective central point 361, but also weighting according to a distance from a position representative of gray (the closer to the position representative of gray, the greater weighting) is performed.

Thus, according to the color conversion relation derivation apparatus 600 shown in FIG. 12, the partial function is derived for each area 360, and thus it is possible to obtain the sufficient accuracy with expression of low degree, such as quadratic expression, of the partial function.

According to the present embodiment of the invention, when the relation between coordinates on the output RGB color space and the associated coordinates on the L*a*b* color space, of the lattice points included in the respective area, is determined, there is used the polynomial approximation. It is acceptable, however, that another technique is used to determine the above-mentioned relation.

Next, there will be explained processing to be executed by the whole function derivation section 630.

Figure 16:
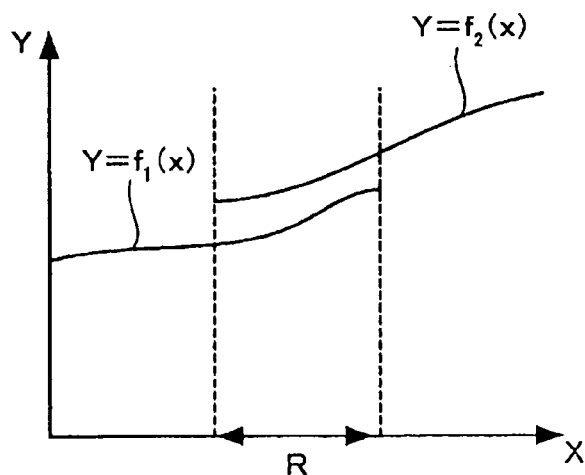
FIG. 16 is a view showing a relation between coordinates on the output RGB color space and the associated coordinates on the L*a*b* color space.

FIG. 16 is a view showing a relation between coordinates on the output RGB color space and the associated coordinates on the L*a*b* color space.

A vertical axis (Y-axis) in FIG. 16 conceptually denotes the coordinates on the L*a*b* color space shown in FIG. 8, and a horizontal axis (X-axis) in FIG. 16 conceptually denotes the coordinates of the output RGB color space shown in FIG. 7 (FIG. 12). A curve $Y=f_1(x)$ shown in FIG. 16 indicates a partial function in a certain area 360. A curve $Y=f_2(x)$ shown in FIG. 16 indicates a partial function in an adjacent area 360 overlapping with the certain area 360. The color conversion relation derivation apparatus 600 shown in FIG. 11 independently derives the partial functions for each area, and as a result, in a portion in which the areas are overlapped with one another, the curves are not coincident with one another. The whole function derivation section 630 serves to join both the curves smoothly. Here, there will be explained it using an arbitrary point on the output RGB space.

Figure 17:
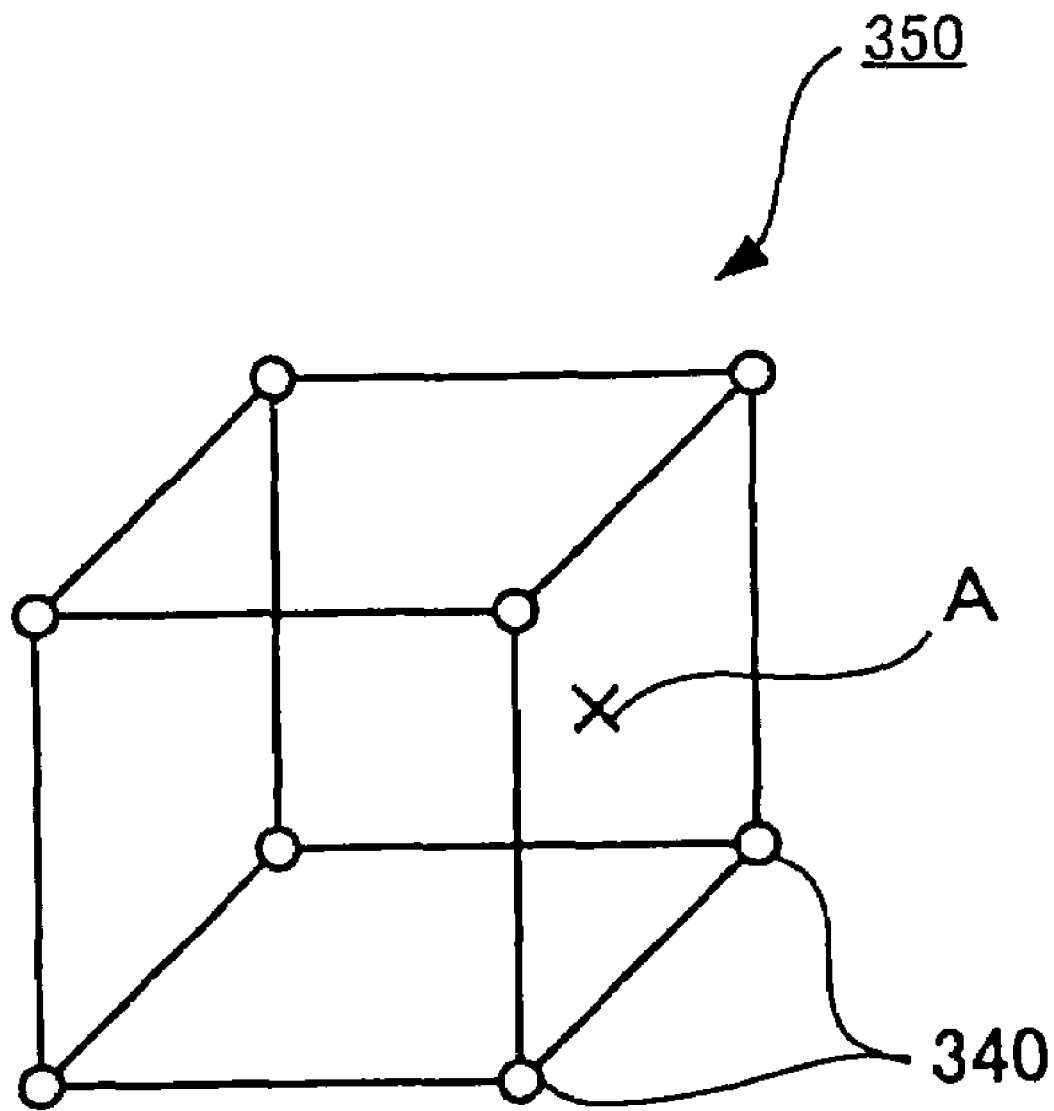
FIG. 17 is a view showing a divided space including an arbitrary point.

FIG. 17 is a view showing a divided space including an arbitrary point.

A divided space 350 shown in FIG. 17 corresponds to an R-portion on the X-axis in FIG. 16, in which the coordinates of the output RGB color space is conceptually denoted. As mentioned above, since the respective divisional points 340 correspond to the central points of anyone of the areas, an arbitrary point located in one divided space 350 is surrounded by the central points 361 of eight areas in which the divided space is a part of each of the areas. Further as mentioned above, the respective central points 361 are associated with the coefficient (aij) computed by the partial function derivation section 620. The whole function derivation section 630 uses the coefficient (aij) associated with the respective central points 361 to perform an eight point interpolation or a four point interpolation, and determines coefficient (aij) of an arbitrary point A and determines a relation between coordinates on the output RGB color space shown in FIG. 7 (FIG. 12) of the arbitrary point A and coordinates on the L*a*b* color space shown in FIG. 8 associated with the coordinates on the output RGB color space in accordance with the above-mentioned expression (1) to expression (3). Thus determined relation offers a function of low degree in which partial functions of two areas overlapped with one another are joined together smoothly. The whole function derivation section 630 performs the processing as mentioned above through the color reproduction area 300 shown in FIG. 12 in its entirety, and finally derives the whole function of low degree in which partial functions of two areas overlapped with one another are joined together smoothly through the color reproduction area 300 in its entirety. As the function representative of the color conversion is of lower degree, it is possible to perform the color conversion at high speed. And thus according to the color conversion relation derivation apparatus 600 shown in FIG. 11, it is possible to derive the reverse color conversion relation capable of performing the reverse color conversion at high speed. Further, according to the present embodiment, the whole function derivation section 630 joins the partial functions of the areas 360 together smoothly. This feature makes it possible to perform smoothing with greater accuracy. As a result, it is possible to derive the color conversion relation capable of enhancing accuracy of the color conversion through the color space in its entirety. Further, in the event that the reverse color conversion relation, which is derived by the color conversion relation derivation apparatus 600 according to the present embodiment, is used to perform two stages of color conversion such as the input RGB color space—a L*a*b* color space—the output RGB color space, as shown in FIG. 6, even if it is concerned with a portion going over the color reproduction area 300 of the output side, of the color reproduction area of the input side, the expression of low degree of the whole function makes it possible to ensure accuracy of the color conversion to some degree. To record the reverse color conversion relation, which is derived by the color conversion relation derivation apparatus 600 according to the present embodiment, it is effective that the coefficient (aij) in the respective items from the above-mentioned expression (1) to expression (3), which is determined by the partial function derivation section 620, and the coefficient (aij), which is determined by the whole function derivation section 630, are saved in form of LUT. Thus, it is possible for the personal computer 20 shown in FIG. 1 to store the reverse color conversion relation with little capacity.

According to the present embodiment, the reverse color conversion relation is derived. In view of the fact that the reverse color conversion relation is high in accuracy of reverse reference, it is possible to use the reverse color conversion relation when not only the reverse color conversion is performed, but also the forward color conversion is performed. Further, the present invention is also applicable as a method of deriving the forward color conversion relation.

As mentioned above, according to the present invention, it is possible to derive both forward and reverse color conversion relations at high speed and with greater accuracy.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A color conversion relation derivation method of deriving a color conversion relation between a first color space and a second color space, the color conversion relation derivation method comprising:

an area forming step that forms a plurality of areas filling the first color space such that the plurality of areas are arranged in lattice configuration and partially overlay each other in the first color space;

a partial function derivation step that derives, for each of the areas formed in the area forming step, a coefficient of a partial function representative of a color conversion between coordinates in the area and coordinates of the second color space using a set of an arbitrary sample point provided in the first color space and a point in the second color space, which is associated with the sample point; and a whole function derivation step that, in a range that the areas are overlapped with each other, combines the partial functions by obtaining a coefficient interpolated by the coefficient of the partial function for each of the overlapped areas and by deriving a function represented by the interpolated coefficient, and derives a whole function representative of the color conversion relation through the first color space in its entirety.

2. A color conversion relation derivation apparatus for deriving a color conversion relation between a first color space and a second color space, the color conversion relation derivation apparatus comprising:

an area forming section that forms a plurality of areas filling the first color space such that the plurality of areas are arranged in lattice configuration and partially overlay each other in the first color space;

a partial function derivation section that derives, for each of the areas formed in the area forming section, a coefficient of a partial function representative of a color conversion between coordinates in the area and coordinates of the second color space using a set of an arbitrary sample point provided in the first color space and a point in the second color space, which is associated with the sample point; and a whole function derivation section that, in a range that the areas are overlapped with each other, combines the partial functions by obtaining a coefficient interpolated by the coefficient of the partial function for each of the overlapped areas and by deriving a function represented by the interpolated coefficient, and derives a whole function representative of the color conversion relation through the first color space in its entirety.

3. A color conversion relation derivation program storage medium storing a color conversion relation derivation program which causes a computer to operate as a color conversion relation derivation apparatus, when the color conversion relation derivation program is incorporated into the computer and is executed, the color conversion relation derivation apparatus comprising:

an area forming section that forms a plurality of areas filling the first color space such that the plurality of areas are arranged in lattice configuration and partially overlay each other in the first color space;

a partial function derivation section that derives, for each of the areas formed in the area forming section, a coefficient of a partial function representative of a color conversion between coordinates in the area and coordinates of the second color space using a set of an arbitrary sample point provided in the first color space and a point in the second color space, which is associated with the sample point; and a whole function derivation section that, in a range that the areas are overlapped with each other, combines the partial functions by obtaining a coefficient interpolated by the coefficient of the partial function for each of the overlapped areas and by deriving a function represented by the interpolated coefficient, and derives a whole function representative of the color conversion relation through the first color space in its entirety.

4. The color conversion relation derivation method according to claim 1, wherein each area formed by the area forming step is of equal size.

5. The color conversion relation derivation method according to claim 1, wherein the area forming step separates the first color space into a plurality of sections, wherein the plurality of areas are formed in the plurality of sections.

6. The apparatus of claim 2, wherein the partial function derivation section comprises determining a weighted function of the set of arbitrary sample points to a point overlapping each of the plurality of areas.

7. The color conversion relation derivation method according to claim 1, wherein the area defining step assigns a plurality of divisional points to a lattice, thereby forming the plurality of areas filling the first color space.

8. The apparatus of claim 2, wherein the area forming section assigns a plurality of divisional points to a lattice, thereby forming the plurality of areas filling the first color space.

9. The color conversion relation derivation method according to claim 1, wherein the partial function is a polynomial expression of the first color space.

10. The color conversion relation derivation method according to claim 9, wherein the whole functions is a smoothing function to join each polynomial expression with at least one other polynomial expression.

11. The color conversion relation derivation method according to claim 1, wherein the partial function derivation step is a step to derive the coefficient of the partial function in the area by a coefficient least square method in which the sample point in the first color space is weighted in accordance with a distance from a center of the area.

12. The color conversion relation derivation method according to claim 1, wherein the partial function derivation step is a step to derive the coefficient of the partial function by weighing accordance with a distance from a position representative of gray in the first color space.

* * * * *